Aug. 13, 1940.  E. J. FRASER  2,211,229
TRAILER
Filed July 30, 1936   3 Sheets-Sheet 1
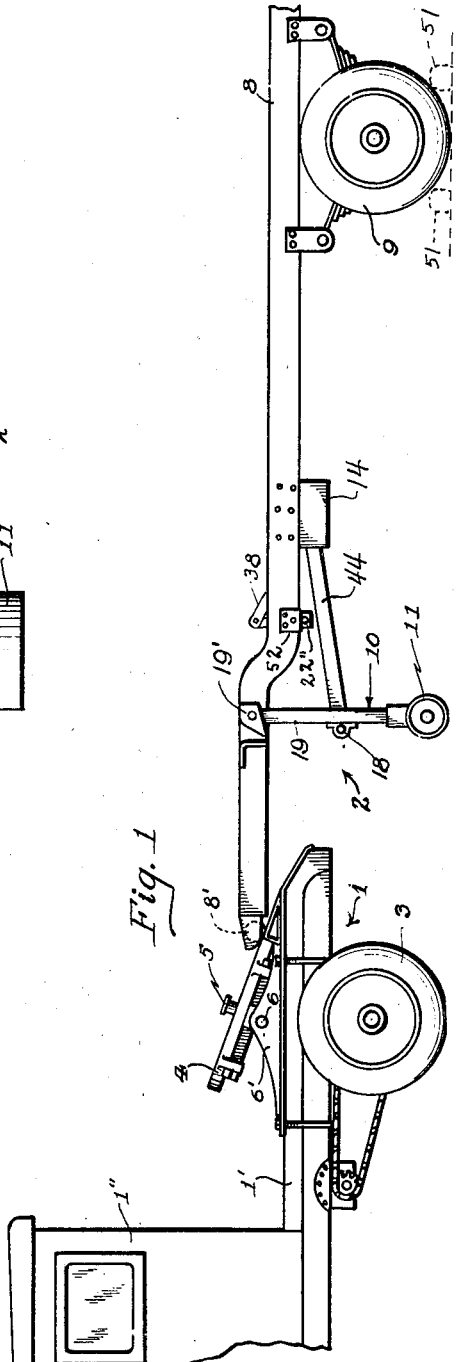
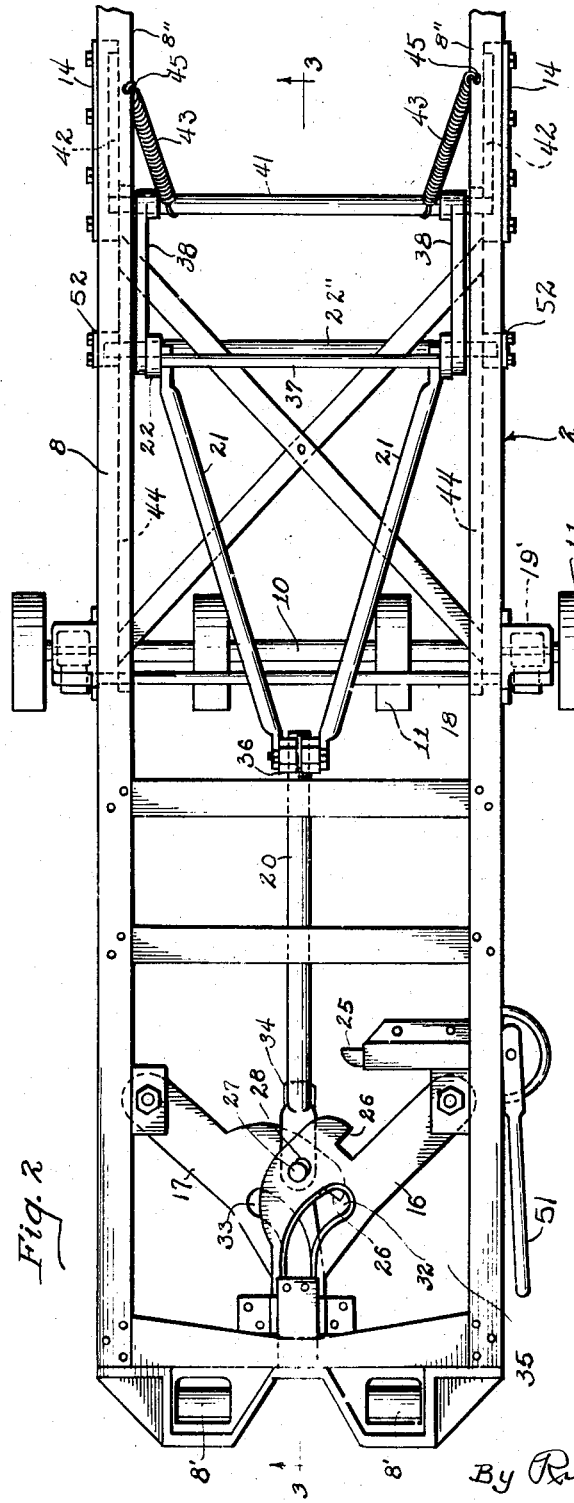
Inventor
Edwin J. Fraser
By Rummler, Rummler & Woodworth
Attys.

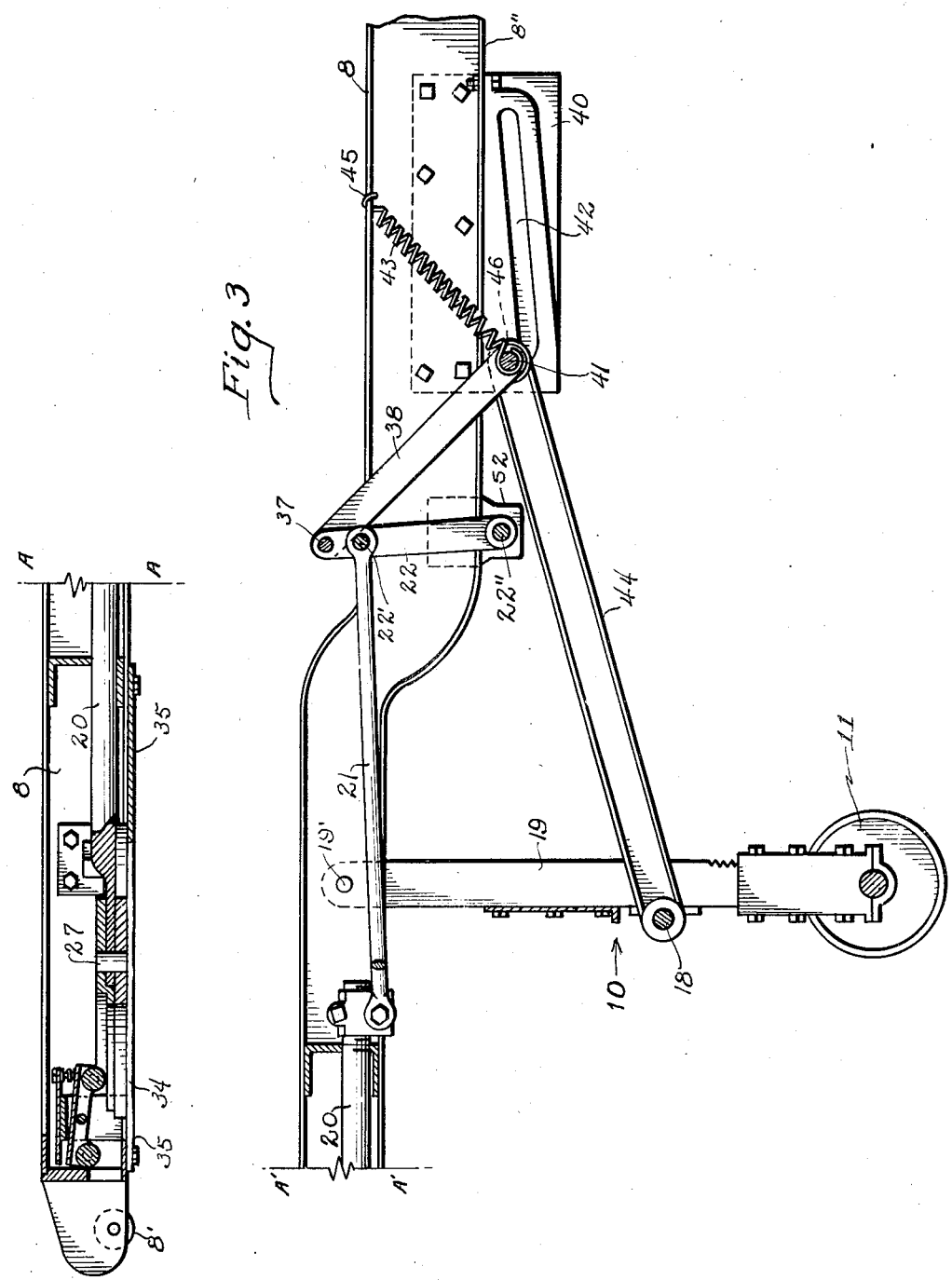

Aug. 13, 1940. E. J. FRASER 2,211,229
TRAILER
Filed July 30, 1936 3 Sheets-Sheet 3
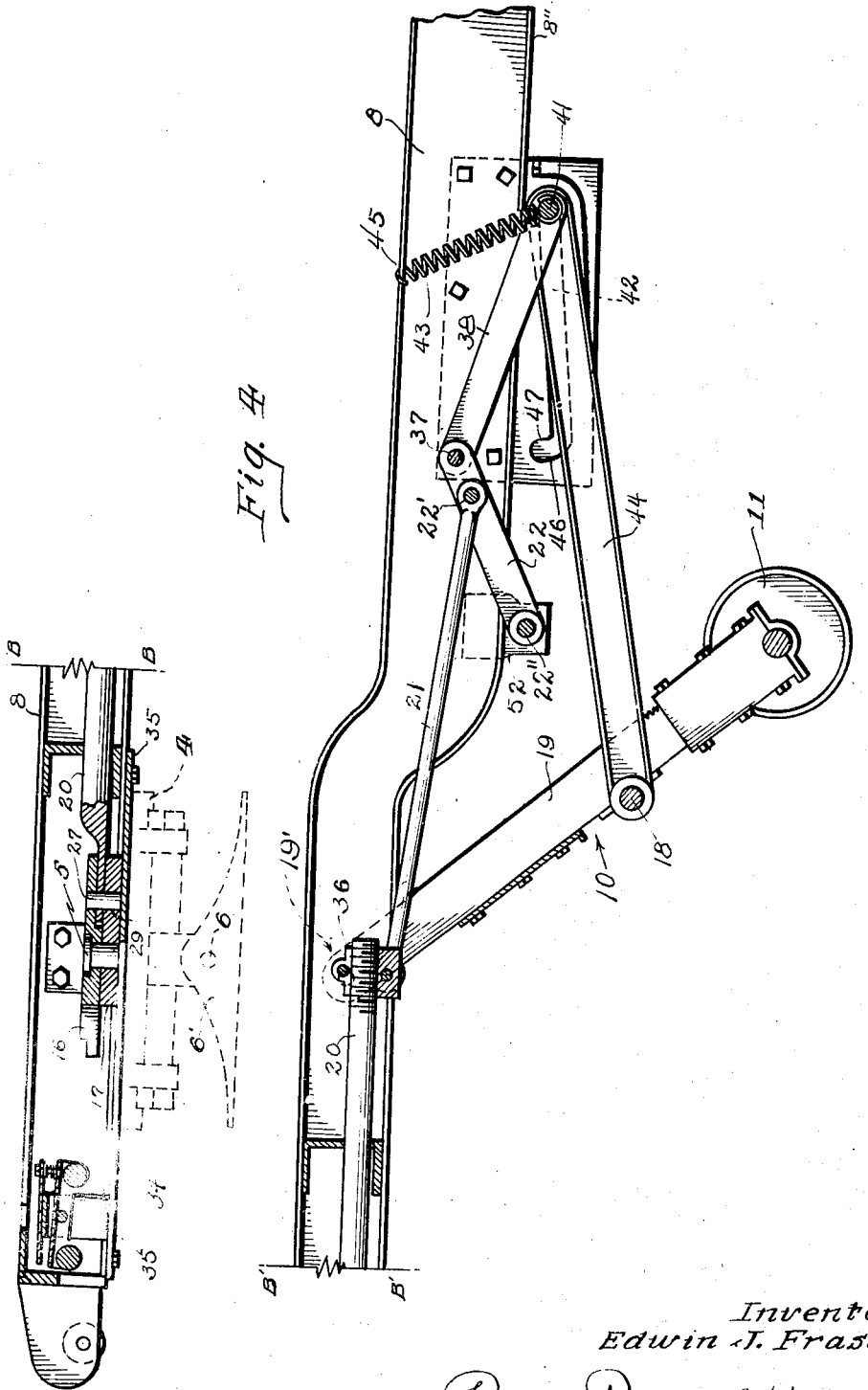
Inventor:
Edwin J. Fraser
By Rummler Rummler & Woodworth
Attys.

Patented Aug. 13, 1940

2,211,229

UNITED STATES PATENT OFFICE 2,211,229

TRAILER

Edwin J. Fraser, Riverside, Ill., assignor to Keeshin Motor Express Co., Inc., Chicago, Ill., a corporation of Illinois Application July 30, 1936, Serial No. 93,401

3 Claims. (Cl. 280—33.1)

This invention relates to commuting trailers or vehicle units of the semitrailer type, such as shown in my copending earlier application Serial No. 88,606, filed July 2, 1936; and more particularly to undercarriage mechanisms for such semitrailers, hereinafter referred to as trailers, and to operating modes therefor.

The main objects of this invention are to provide such a mechanism of improved form and advantageous mode of operation; to provide a trailer of the kind referred to with automatic means to raise and lower its front undercarriage coincidently with and by the trailer coupling and uncoupling operations relative to an appropriate tractor, such for instance as illustrated in the accompanying drawings; and to provide for numerous further advantages such as will be apparent from the following description.

This invention is illustrated by the accompanying drawings, in which:

Figure 1 is a side view of a trailer and the rear end of a tractor in proximate endwise relation thereto, ready to lift and couple the trailer.

Fig. 2 is a plan view of about the front half of a trailer such as shown in Fig. 1 and in the same uncoupled position.

Fig. 3 shows a longitudinal vertical section of the trailer taken on the line 3—3 of Fig. 2.

Fig. 4 is a similar sectional view showing the folding undercarriage mechanism raised.

The following description and the appended claims are directed mainly to the folding undercarriage mechanism of the trailer, and to its operating and control means. The coupling means and its mode of operation are fully shown and described in my said earlier application.

In transportation systems of the kind here concerned, an automotive tractor 1, which may be one of a relatively small group, is interchangeably and selectively attachable to any one of a usually more numerous group or "fleet" of load carrying trailers 2, each of the latter being equipped with ready means to support its front end whenever the trailer is not attached to and supported by a tractor.

The tractor 1, represented only by its rear part in Fig. 1 of the drawings, is of the usual type for systems of this general sort, and comprises a chassis or frame 1', a cab 1'', and other customary parts, not all shown, together with rear traction wheels or drivers 3 and the lower member 4 of an automatic coupling device which as a whole comprises a pair of complementary fifth wheel members, upper and lower, such as fully set forth in my said earlier application.

The table 4 or fifth wheel proper, having a headed kingpin 5, is rockably mounted on a transversely disposed horizontal shaft 6 journaled in bearing 6' on the tractor 1, to permit backward tilting of the fifth wheel table 4 to its normal uncoupled position, as shown in Fig. 1, to facilitate the coupling operation. Gravity tends to maintain the inclined position, but coupling the trailer swings the table up to horizontal, where it is held by the trailer during use.

In the drawings, for convenience in illustrating my invention, I have shown the chassis of the trailer, but the body has been omitted. When reference is herein made to a trailer, the entire trailer unit is intended, that is to say, the body thereof as well as the chassis and all the component parts which make up a transport trailer of this sort.

The said trailer 2 comprises the usual underframe or chassis 8, rear road wheels 9, and a folding front undercarriage 10 having trundle wheels 11 for temporary use when the tractor is removed.

In order to positively assure effective functioning of said undercarriage it is automatically foldable upwardly by the engaging operation of the fifth wheel coupler when the tractor is attached, and vice versa for downward swinging for trailer support when the tractor is uncoupled.

For this purpose, a complete linkage or chain of mechanism extends from the pivoted coupling jaws or keepers 16 and 17, on the front of the trailer, back and down to the undercarriage 10, where it is pivoted to a crossbar 18 carried by the undercarriage struts or legs 19 which are pivoted to the chassis at 19'. This linkage comprises the shaft 20, a pair of diagonal struts 21, swing-arms 22, and certain links and other elements hereinafter referred to, whereby the downwardly extensile support 10 is positively projected.

The forked keepers 16 and 17 of the automatic coupler, pivoted to the chassis at 23 and 24 respectively, are swung rearward coactively by the king-pin 5 in coupling the trailer, and vice versa in uncoupling, as explained in my said earlier application.

Rearward coupling engagement of the keepers with king-pin 5 is secured by the manually releasable automatic spring latch 25 on the chassis, which latch engages the catch shoulders 26 on keepers 16 and 17, as will be understood.

In order to provide for a directly forward and rearward movement of the link-rod or shaft 20, the connection thereof to the overlapping keeper jaws 16 and 17 is by means of a vertical cross pin 27 fixed on said shaft, to ride in the keeper slots 28 and 29. These slots are back of and about parallel with the arcuate keeper ways or cam slots 32 and 33 for the king-pin, but are relatively short.

In connecting a tractor to a trailer, the tractor 1 is backed against the front end of the trailer 2, the later being secured against movement, as for instance by blocking the wheels 9, and the anti-friction rollers 8' on chassis 8 ride up on the inclined plate 4 which in due course swings to its horizontal position.

The king-pin 5 slides back in the central guide slot 34 of the chassis bottom plate 35, and in so doing enters and follows the cam slots 32 and 33 in the keepers 16—17, and this causes the latter to swing backward into nearly parallel crosswise position for coupling, where they are secured by the automatic latch 25.

This rearward swing of the keeper arms 16—17 carries back forcibly the pin 27 and with it the shaft 20 and struts 21 which shaft and struts are joined adjustably lengthwise of said shaft by means of the clamping split sleeve or collar 36.

These struts 21 at their rearward ends are pivoted to medial points 22' on links 22, there being one such link on each side of the chassis. Each link 22 swings in a vertical plane on a fixed pivot 22" at the lower end. The upper ends of links 22, which are rearward when the coupling is effective, are pivoted at 37 to the forward ends of downwardly inclined links 38, the rearward lower ends of which slidably engage horizontally disposed guideways on depending fixed plates 40 secured to the chassis side sills 8".

For this purpose said links 38 have a common pivot rod 41 the ends of which engage plate guideways or slots 42. Secured to these pivot rods 41 also are retractile means 43 represented as tension springs, and other links 44 extending forwardly and somewhat downwardly to pivotally engage medially the wheeled main carriage struts 19 at 18.

The said springs extend upward from the sliding pivot bar 41 each to the upper flange of the chassis side rail or sill 8" on each side where secured at a point 45 over and about midway between the front and rear ends of the corresponding guide slots. Said springs 43 incline forward from point 45 when the trailer is uncoupled and rearward when coupled. The forward end of each slot 42 turns upward at 46 to provide a catch shoulder 47 for pivot 41, to secure the control mechanism set with the undercarriage "down" until released by the coupling operation acting rearwardly through links 38 as will be understood.

Whenever the trailer is to be disconnected, the rear wheels 9 are first secured against turning, as by blocks 51. The operator then swings the lock arm 51 outward enough to release the coupler latch 25. The tractor 1 is then driven forward, thus causing the king-pin 5 carried thereby to pull the now released keeper arms 16—17 forward to the position of Fig. 2. This operates to pull the bar 20 forward and with it the struts 21 and the upper ends of links 22. This pulls forward links 38 and 44 against the tension of springs 43. The upward pull of links 38 and springs 43 serves to snap the pivot rod 41 upwardly into engagement with lock shoulders 46.

The forward push of links 44 against struts 19 operates to swing the retrahent undercarriage 10 down to its effective supporting position, where it is automatically locked by said pivot rod 41 engaging the shoulders 47.

In order to maintain a desirably low position for the linkage members 22 and their immediate connections, the lower pivots 22" therefor are carried on special dependent lugs 52 fixed on the chassis sills 8".

Although the shaft 21 is shown threaded at the split-coupling end, this is not necessary, mere friction clamping ordinarily being sufficient, though the contact faces of said shaft and the sleeve 36 may well be roughened to assure against slipping.

For the sake of strength, mechanical advantage and simplicity of design, the pivots for the undercarriage and its control mechanism are all in the form of bars disposed crosswise of the chassis, mainly underneath, and having a pivot function at each end as will be apparent.

It is to be understood that some of the details set forth may be altered or omitted without departing from the spirit of the invention as defined by the following claims.

I claim:

1. A trailer having automatic tractor operated coupling means at its front end, a retrahent support for said front end comprising a pair of tread wheel struts pivoted to the sides of the trailer, a pair of horizontally slotted guide plates. one on each side back of a corresponding strut, a pair of links each connecting a strut to the corresponding plate in sliding relation to the latter, retractile spring means urging said links backward along the guide slots to raise said support, and linkage means extending forward from the rear end of said links to said coupling means.

2. A trailer having automatic tractor operated lifting and coupling means at its front end, an upwardly folding support for said front end comprising a pair of tread struts pivoted to the sides of the trailer, a pair of horizontally slotted guide plates, one on each side back of a corresponding strut, a pair of links connecting said struts to said plates in sliding relation to the latter, retractile springs urging said links backward along the guide slots to raise said support, and linkage means extending forward from the rear end of said links to said coupling means, said slots having lateral stop shoulders at their forward ends to secure forward setting of the linkages until released by the coupling operation.

3. A two-wheel trailer having an automatic coupling member, a foldable strut to support the front end of said trailer when standing alone, said strut being pivoted at its upper end to said trailer for upward folding, and being retrahent when the trailer is lifted and connected to a tractor, and control means comprising a link pivoted to said strut and slidably engaging said trailer back of the top pivot end of said strut, a tension spring connected at one end above the slideway for said link, which slideway turns up at its front end, a second link extending diagonally upward and forward from the rear end of the first said link, a third link pivoted at one end to a low point on said trailer and at its other end being pivoted to the second said link, a fourth link pivoted at one end medially to said third link, and a rod connected at one end to the other end of said fourth link, and at its other end to said coupling member.

EDWIN J. FRASER.